(12) United States Patent
Xu et al.

(10) Patent No.: US 12,322,138 B2
(45) Date of Patent: Jun. 3, 2025

(54) METHOD AND DEVICE FOR CORNER MARKING AND PARAMETER CALIBRATION

(71) Applicant: Rockchip Electronics Co., Ltd., Fuzhou (CN)

(72) Inventors: Da Xu, Fuzhou (CN); Jihui Xie, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 108 days.

(21) Appl. No.: 18/102,778

(22) Filed: Jan. 30, 2023

(65) Prior Publication Data

US 2023/0245346 A1 Aug. 3, 2023

(30) Foreign Application Priority Data

Jan. 28, 2022 (CN) .......................... 202210104422.8

(51) Int. Cl.
*G06T 7/80* (2017.01)
*G06T 7/13* (2017.01)
*H04N 17/00* (2006.01)

(52) U.S. Cl.
CPC ............... *G06T 7/80* (2017.01); *G06T 7/13* (2017.01); *H04N 17/002* (2013.01); *G06T 2207/30204* (2013.01); *G06T 2207/30244* (2013.01)

(58) Field of Classification Search
CPC . G06T 2207/30204; G06T 2207/30208; G06T 2207/30244; G06T 7/13; G06T 7/80
USPC .......................................................... 348/38
See application file for complete search history.

(56) References Cited

U.S. PATENT DOCUMENTS

| 2009/0184171 | A1* | 7/2009 | Lv | G06V 10/24 235/494 |
| 2019/0022517 | A1* | 1/2019 | Socorregut | A63F 3/00643 |
| 2019/0220988 | A1* | 7/2019 | Schneider | G01S 17/58 |

FOREIGN PATENT DOCUMENTS

| CN | 103019643 B | * | 12/2015 | H04N 5/74 |
| CN | 112446895 A | * | 3/2021 | G06T 7/13 |
| CN | 107680035 B | * | 8/2021 | G06T 3/0018 |
| CN | 110599541 B | * | 3/2022 | G01S 7/497 |
| CN | 108648237 B | * | 5/2022 | G06T 7/85 |
| CN | 114445499 A | * | 5/2022 | G06T 7/80 |
| CN | 109859226 B | * | 6/2022 | G06T 7/13 |

(Continued)

*Primary Examiner* — Behrooz M Senfi
(74) *Attorney, Agent, or Firm* — IPRTOP LLC

(57) ABSTRACT

A corner marking method, a parameter calibration method, and an electronic device are provided. The corner marking method includes: acquiring a target image, the target image including at least a portion of a target chessboard; detecting corners in the target image; performing a chessboard reconstruction based on detected corners to acquire a reconstructed chessboard; if the reconstructed chessboard contains one or more of tagging squares, acquiring one of the tagging squares of the reconstructed chessboard as a reference square; acquiring an identification and orientation of the reference square based on a tag of the reference square; marking corners in the reconstructed chessboard based on the identification and orientation of the reference square. Even if the target image does not contain a complete target chessboard, the corner marking method described in the present disclosure is still capable of marking corners in the target image.

17 Claims, 8 Drawing Sheets

(56) References Cited

FOREIGN PATENT DOCUMENTS

| DE | 202014011514 U1 | * | 12/2021 | ............... | G06T 7/33 |
| KR | 20190130407 A | * | 11/2019 | ............... | G06T 7/80 |

* cited by examiner

METHOD AND DEVICE FOR CORNER MARKING AND PARAMETER CALIBRATION

CROSS REFERENCE TO RELATED APPLICATION

The present application claims the benefit of priority to Chinese Patent Application No. CN 2022101044228, entitled "Method for Corner Marking and Parameter Calibration, Medium and Electronic Device", filed with CNIPA on Jan. 28, 2022, the disclosure of which is incorporated herein by reference in its entirety for all purposes.

FIELD OF TECHNOLOGY

The present disclosure belongs to the field of image processing and relates to a marking method, in particular to method and device for corner marking and parameter calibration.

BACKGROUND

In image measurement and machine vision applications, in order to determine the interrelationship between a three-dimensional location of a point on the surface of a spatial object and its corresponding point in an image, a geometric model of camera imaging needs to be established, and parameters of the geometric model are called camera parameters. Camera parameters are usually acquired through experiments and calculations, and the process of acquiring the parameters is called camera calibration. In the related art, camera calibration for multi-camera systems usually requires that each of multiple cameras simultaneously captures a complete chessboard in order to acquire the specification of the chessboard (i.e., numbers of corners of the chessboard along the x-axis and y-axis respectively) and input the specification into corresponding detection algorithms to achieve camera calibration.

SUMMARY

The present disclosure provides a corner marking method, including: acquiring a target image comprising at least a portion of a target chessboard, the target chessboard comprising at least one tagging square, and each tagging square having a tag that indicates an identification and orientation of the tagging square; detecting corners in the target image; performing a chessboard reconstruction based on detected corners to acquire a reconstructed chessboard; acquiring one or more of the tagging squares of the reconstructed chessboard as a reference square if the reconstructed chessboard contains one or more of the tagging squares; acquiring the identification and orientation of the reference square based on the tag of the reference square; and marking the corners in the reconstructed chessboard based on the identification and orientation of the reference square.

In one embodiment, detecting the corners in the target image comprises: acquiring the corners in the target image based on gradients at pixels in the target image.

In one embodiment, acquiring the corners in the target image based on the gradients at the pixels in the target image comprises: acquiring potential corners in the target image based on the gradients at the pixels in the target image; and filtering to obtain the corners in the target image based on positional relationships among the potential corners.

In one embodiment, marking the corners in the reconstructed chessboard based on the identification and orientation of the reference square comprises: acquiring corner marks of the reference square based on the identification and orientation of the reference square; and marking the corners in the reconstructed chessboard based on the corner marks of the reference square and positional relationships between the reference square and the corners in the reconstructed chessboard.

In one embodiment, acquiring the target image comprises: acquiring the target image by means of a multi-camera system, wherein cameras of the multi-camera system have field of views (FOVs) partially overlapping with each other.

In one embodiment, the multi-camera system comprises a fisheye panoramic camera system.

In one embodiment, acquiring the target image comprises: acquiring the target image to acquire at least two target chessboards.

In one embodiment, the tag of the reference square comprises a two-dimensional code indicating locations of the corners of the reference square.

In one embodiment, the target chessboard comprises five tagging squares, and the five tagging squares are respectively located in a center and four vertexes of the target chessboard.

The present disclosure further provides a parameter calibration method, comprising: acquiring a target image comprising at least a portion of a target chessboard, the target chessboard comprising at least one tagging square, and each tagging square having a tag that indicates an identification and orientation of the tagging square; detecting corners in the target image; performing a chessboard reconstruction based on detected corners to acquire a reconstructed chessboard; acquiring one or more of the tagging squares of the reconstructed chessboard as a reference square if the reconstructed chessboard contains one or more of the tagging squares; acquiring the identification and orientation of the reference square based on the tag of the reference square; marking the corners in the reconstructed chessboard based on the identification and orientation of the reference square; and calibrating camera parameters based on the marked corners of the target image.

In one embodiment, detecting the corners in the target image comprises acquiring the corners in the target image based on gradients at pixels in the target image.

In one embodiment, acquiring the corners in the target image based on the gradients at the pixels in the target image comprises: acquiring potential corners in the target image based on the gradients at the pixels in the target image; and filtering to obtain the corners in the target image based on positional relationships among the potential corners.

In one embodiment, marking the corners in the reconstructed chessboard based on the identification and orientation of the reference square comprises: acquiring corner marks of the reference square based on the identification and orientation of the reference square; and marking the corners in the reconstructed chessboard based on the corner marks of the reference square and positional relationships between the reference square and the corners in the reconstructed chessboard.

The present disclosure further provides an electronic device, comprising: a memory, configured to store a computer program; and a processor, communicatively coupled to the memory and configured to call the computer program to perform: acquiring a target image comprising at least a portion of a target chessboard, the target chessboard comprising at least one tagging square, and each tagging square having a tag that indicates an identification and orientation of the tagging square; detecting corners in the target image; performing a chessboard reconstruction based on detected corners to acquire a reconstructed chessboard; acquiring one or more of the tagging squares of the reconstructed chessboard as a reference square if the reconstructed chessboard contains one or more of the tagging squares; acquiring the identification and orientation of the reference square based on the tag of the reference square; and marking the corners in the reconstructed chessboard based on the identification and orientation of the reference square.

In one embodiment, detecting the corners in the target image comprises acquiring the corners in the target image based on gradients at pixels in the target image.

In one embodiment, acquiring the corners in the target image based on the gradients at the pixels in the target image comprises: acquiring potential corners in the target image based on the gradients at the pixels in the target image; and filtering to obtain the corners in the target image based on positional relationships among the potential corners.

In one embodiment, marking the corners in the reconstructed chessboard based on the identification and orientation of the reference square comprises: acquiring corner marks of the reference square based on the identification and orientation of the reference square; and marking the corners in the reconstructed chessboard based on the corner marks of the reference square and positional relationships between the reference square and the corners in the reconstructed chessboard.

In one embodiment, the electronic device further comprises a multi-camera system, wherein cameras of the multi-camera system have field of views (FOVs) partially overlapping with each other, wherein acquiring the target image comprises: acquiring the target image by the multi-camera system.

In one embodiment, the tag of the reference square comprises a two-dimensional code indicating locations of four corners of the reference square.

In one embodiment, the processor is further configured to call the computer program to perform: calibrating camera parameters based on the marked corners of the target image.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout may also be more complicated. In addition, in this document, relationship terms such as "first", "second", etc. are used only to distinguish one entity or operation from another, and do not necessarily require or imply any such actual relationship or sequence between these entities or operations.

Figure 1:
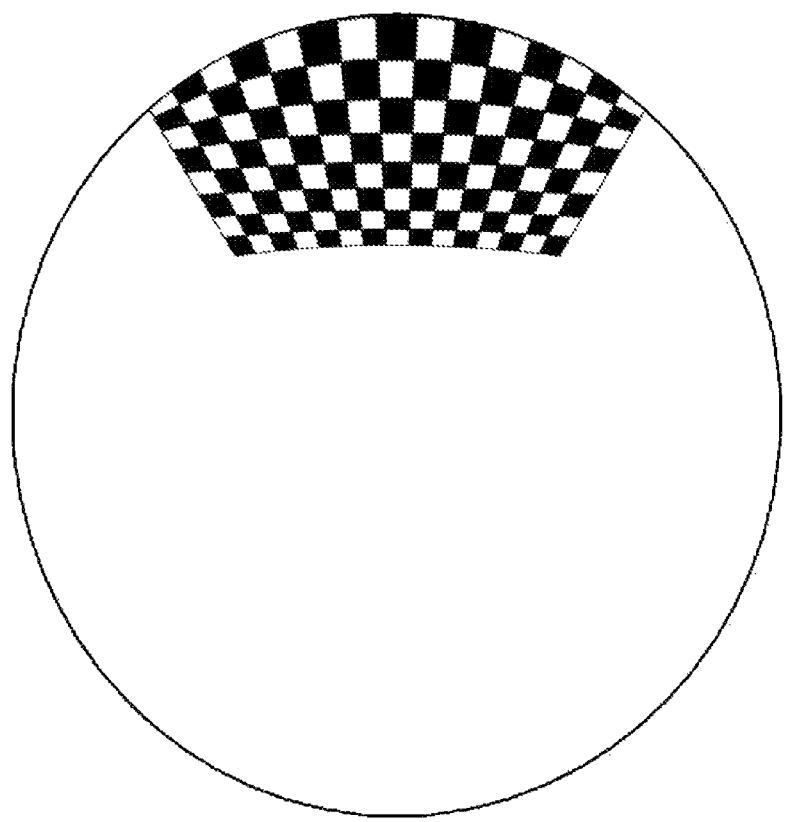
FIG. 1 shows an exemplary drawing of a chessboard captured by a camera in the related art.

FIG. 1 shows an exemplary drawing of a chessboard captured by a camera. According to certain embodiments of the present disclosure. As shown in FIG. 1, for multi-camera systems such as dual-fisheye panoramic camera systems or multi-camera systems with little FOV overlapping, it is impossible for two or more cameras of one multi-camera system to respectively capture a complete chessboard at the same time without distorting the captured chessboard, which makes it difficult to implement certain techniques to these multi-camera systems. Therefore, how to calibrate multi-camera parameters when one camera cannot capture a complete chessboard has become one of the urgent technical problems to be solved.

The present disclosure provides a corner marking method for a multi-camera system. The corner marking method is used to mark corners in a target chessboard, the target chessboard includes one or more tagging squares, and each tagging square has a corresponding tag capable of indicating the identification and orientation of the tagging square. According to embodiments of the present disclosure, at least one tagging square is provided in the chessboard for marking, where the chessboard with the tagging square is utilized for purposes of camera calibration and shooting. The tagging square is capable of indicating orientations or the positions of its four corners that are derivable from the tagging square. Therefore, embodiments of the present disclosure are able to reduce/eliminate orientation ambiguity of chessboard corners and correctly mark the corners without ambiguity even when the captured chessboard is incomplete or distorted.

Figure 2A:
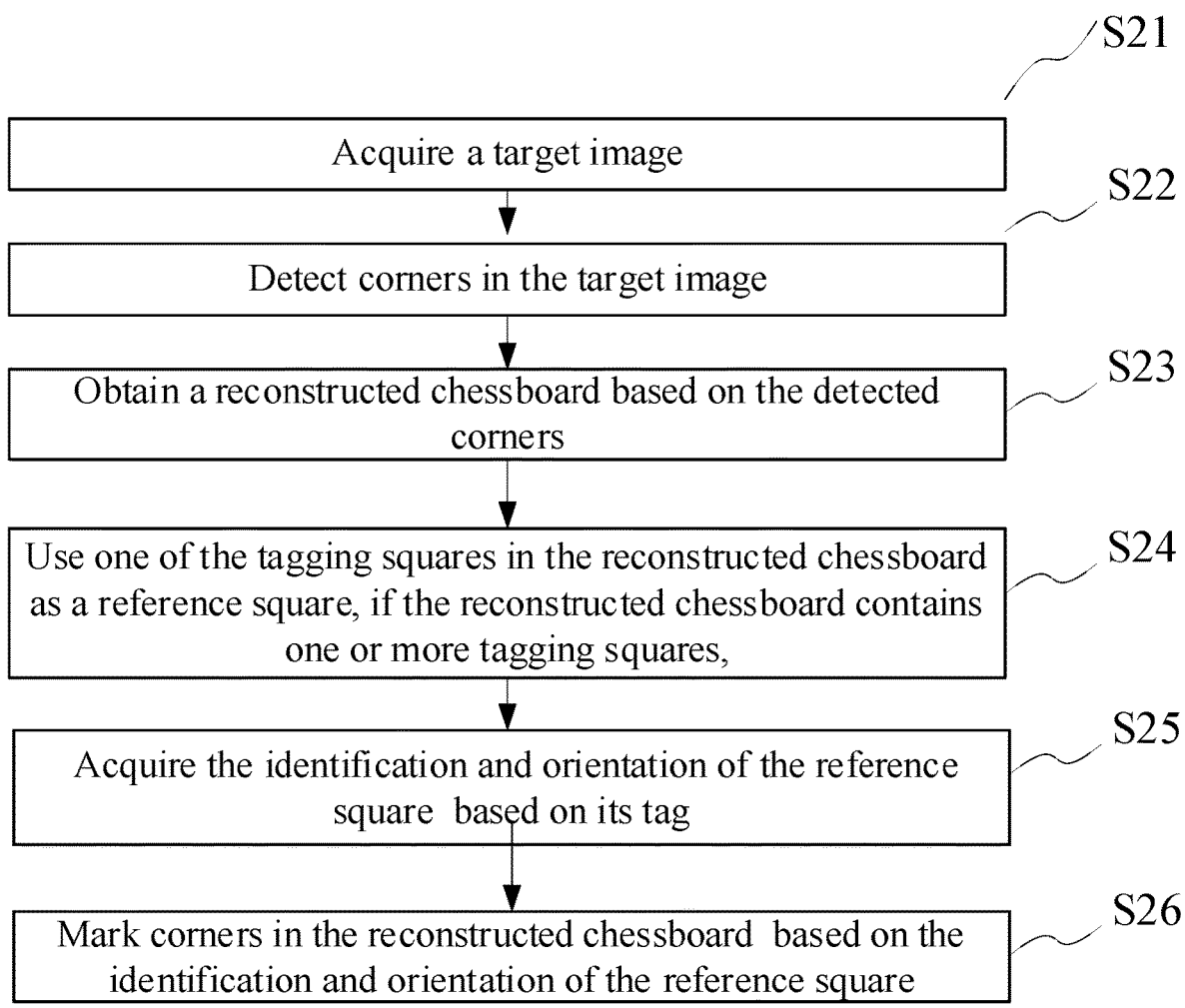
FIG. 2A shows a flowchart of a corner marking method according to one embodiment of the present disclosure.

FIG. 2A is a flowchart illustrating a corner marking process performed by a corner marking system, according to certain embodiments of the present disclosure. Each operation in this process may be performed by one or more specific modules of the corner marking system. In some embodiments, these modules may be modules in a chip such as GPU, DSP, etc. Referring to FIG. 2A, the corner marking process includes operations S21 to S26.

Figure 2B:
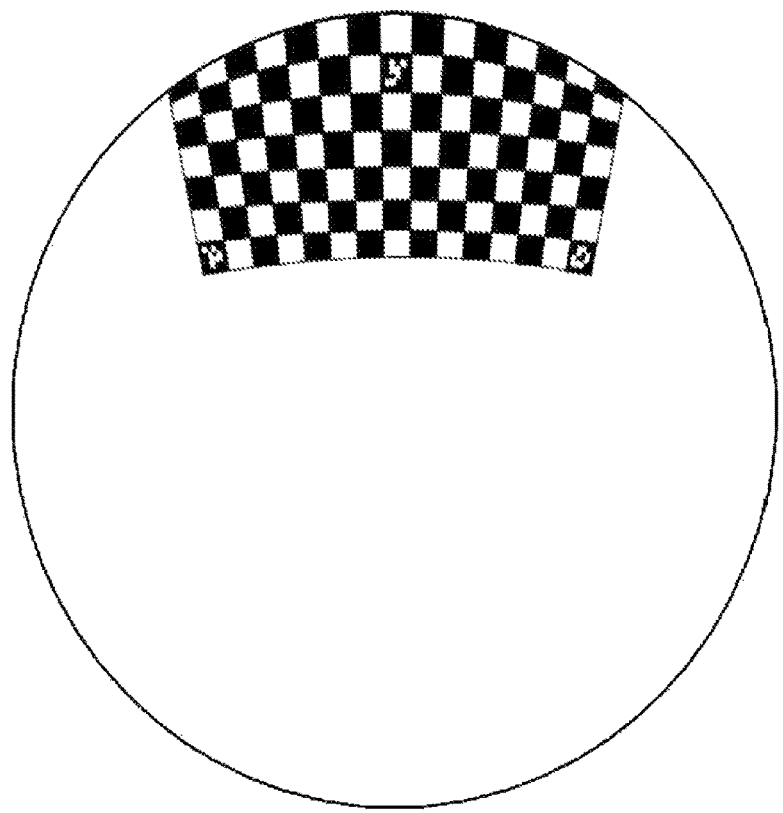
FIG. 2B shows an exemplary target image in a corner marking method according to one embodiment of the present disclosure.

At operation S21, a target image is acquired by an image capturing system and transmitted to a corner marking system. In particular, FIG. 2B shows an exemplary target image in a corner marking process according to certain embodiments of the present disclosure. As shown in FIG. 2B, the target includes a portion of a target chessboard. In other embodiments, the target image may also include the entire target chessboard. In addition, in certain embodiments, the target image may be an image captured by a dual-fisheye panoramic camera system or other multi-camera system with little FOV overlapping, or the target image may be an image captured by any types of cameras.

Figure 2C:
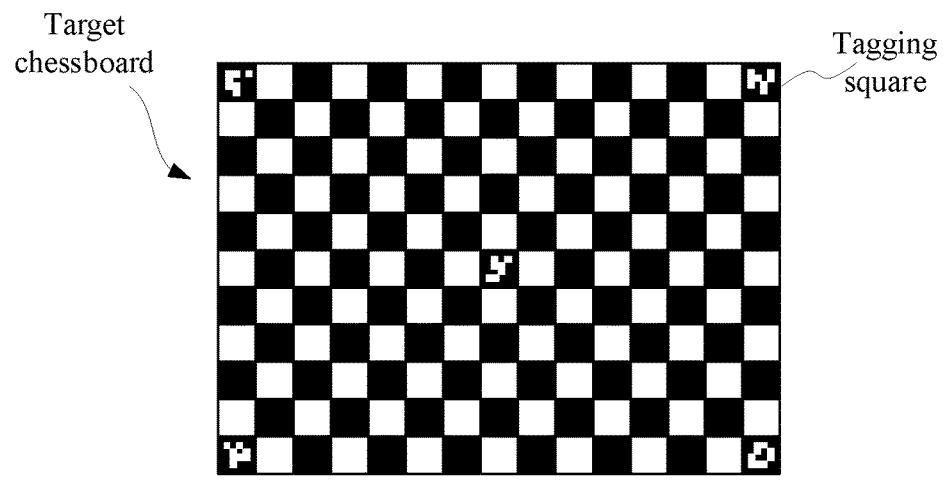
FIG. 2C shows an exemplary chessboard in a corner marking method according to one embodiment of the present disclosure.
Figure 2D:
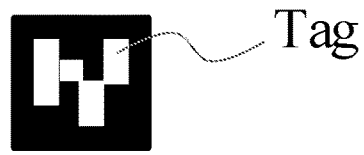
FIG. 2D shows an exemplary tagging square in a corner marking method according to one embodiment of the present disclosure.

Further, FIG. 2C shows an exemplary chessboard in a corner marking process according to certain embodiments of the present disclosure, and FIG. 2D shows an exemplary tag in a corner marking process according to certain embodiments of the present disclosure. As shown in FIG. 2C and FIG. 2D, tagging squares are placed in advance at multiple locations on the target chessboard, and each of the tagging squares includes a corresponding asymmetrical tag similar to the one shown in FIG. 2D.

At operation S22, corners in the target image are detected by the corner marking system. A corner is an intersection formed by two neighboring edges of a square in the target chessboard. That is, a corner is located at a vertex of a square. By detecting the corners in the target image, positional information of the corners can be acquired, which can be represented by coordinates of the corners.

In one embodiment, operation S22 detects inner corners in the target image. An inner corner is an intersection of squares of different colors with a strong contrast between them (e.g., black and white squares) in the target chessboard. For example, a local area centered on an inner corner is divided into four quadrants, the first and third quadrants are of a first color (e.g., black), and the second and fourth quadrants are of a second color (e.g., white). It can be seen that each two diagonal quadrants have the same color and each two neighboring quadrants have different colors, which means gradients at the inner corner are high. That is, two orthogonal directions are defined in a local area centered on an inner corner, and the gradients at the inner corner in these two orthogonal directions are high. Therefore, inner corners in the target image can be detected accurately by introducing mathematical means such as the least squares method. Additionally, detection accuracy of inner corners is higher than that of outer corners. Outer corners are corners that located on edges or at vertexes of the chessboard.

At operation S23, the chessboard is reconstructed based on the detected corners. In one embodiment, the reconstructed chessboard partially reflects structural information of the target chessboard. For example, the reconstructed chessboard may be the largest rectangle that is formed by an array of corners from the corners detected at operation S22, or the reconstructed chessboard may be an image within that largest rectangle. In addition, in some embodiments, the target image includes the complete target chessboard, in which case the reconstructed chessboard reflects the complete structural information of the target chessboard.

At operation S24, if the reconstructed chessboard contains one or more tagging squares, one of the tagging squares in the reconstructed chessboard is used as a reference square. In some embodiments, there is one reference square for each chessboard, and in other embodiments, there are more than one reference squares for each chessboard. Specifically, tag detection can be performed within a coordinate range corresponding to the reconstructed chessboard. Once a tag is detected, it can be confirmed that the reconstructed chessboard contains a tagging square. That is, at operation S24, one or more squares that have tags may be used as one or more reference squares. Hereinafter, for the sake of simplicity, one of the tagging squares in the reconstructed chessboard as shown in FIG. 2B may be deemed the reference square.

At operation S25, the identification and orientation of the reference square are acquired based on its tag. As previously described, the tag of a tagging square can mark the identification and orientation of the tagging square, and thus, the identification and orientation of the reference square can also be acquired based on its tag since the reference square is also a tagging square.

At operation S26, corners in the reconstructed chessboard are marked based on the identification and orientation of the reference square. It should be noted that at operation S26, in some embodiments, one or some corners in the reconstructed chessboard are marked. In other embodiments, all corners in the reconstructed chessboard are marked.

Optionally, when the detection shows that the reconstructed chessboard does not contain any tagging square, operations S24 to S26 may not be performed.

When the reconstructed chessboard contains one or more tagging squares, the corner marking process can mark the corners therein based on the identification or orientation of the one or more tagging squares in the reconstructed chessboard. Even if the target image does not contain a complete target chessboard, the corner marking method described in the present disclosure is still capable of camera calibration based on the corner marking.

In addition, a conventional chessboard does not contain any tagging square. Due to the symmetry and periodicity of the conventional chessboard, there would be orientation ambiguity in detecting inner corners in the two-dimensional space of the conventional chessboard. That is, i.e., a preset coordinate system applied to the chessboard, especially the origin, x-axis, and y axis of the coordinate system, cannot be ascertained from the chessboard itself. For applications that do not tolerate such orientation ambiguity, this may be unacceptable.

The present disclosure includes corner matching using a partially captured chessboard during dual-camera external parameter calibration. Each tagging square of the present disclosure has a tag that marks its identification and orientation, and the orientation ambiguity of the chessboard can be eliminated at operation S26 based on the orientation of the reference square, in which sense the corner marking method is more advantageous than the above-mentioned conventional approach; the corner marking method is particularly suitable for applications that do not tolerate orientation ambiguity.

In an embodiment of the present disclosure, detecting corners in a target image includes: acquiring corners in the target image based on gradients at pixels in the target image. As mentioned earlier, gradients at the corners are relatively high in particular directions, so all the pixels in the target image where gradients in particular directions are greater than a gradient threshold by a certain amount may be acquired as corners in the target image, wherein the gradient threshold can be set in advance according to the actual needs.

In particular, if inner corners in the target image are to be detected, the pixels in the target image where gradients are greater than the gradient threshold in two orthogonal directions can be acquired as the inner corners; and the detection accuracy when inner corners are to be detected is relatively high.

Figure 3A:
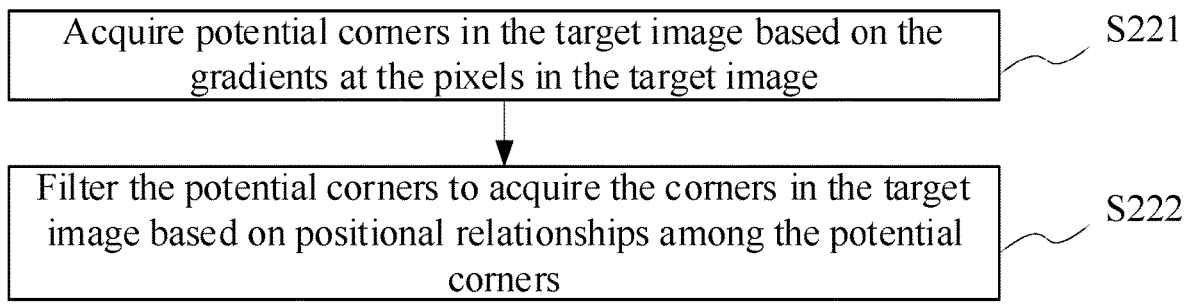
FIG. 3A shows a flowchart of an operation S22 of a corner marking method according to one embodiment of the present disclosure.

FIG. 3A is a flowchart illustrating an operation of detecting corners in a corner marking process according to an embodiment of the present disclosure. Preferably, referring to FIG. 3A, acquiring the corners in the target image based on the gradients at pixels in the target image includes operations S221 and S222.

Figure 3B:
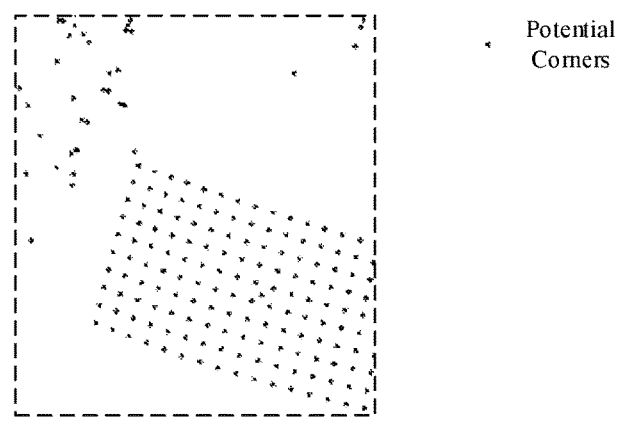
FIG. 3B shows exemplary potential corners in a corner marking method according to one embodiment of the present disclosure.

At operation S221, potential corners in the target image are acquired based on the gradients at the pixels in the target image. FIG. 3B shows exemplary potential corners in a corner marking process according to one embodiment of the present disclosure. Note that a potential corner may or may not be an actual corner. The potential corners share some preliminary characteristics with the actual corners. The potential corners may be pixels where gradients are greater than the gradient threshold in a particular direction. In addition, the potential corners may be further limited to pixels where gradients are greater than the gradient threshold in two orthogonal directions.

Figure 3C:
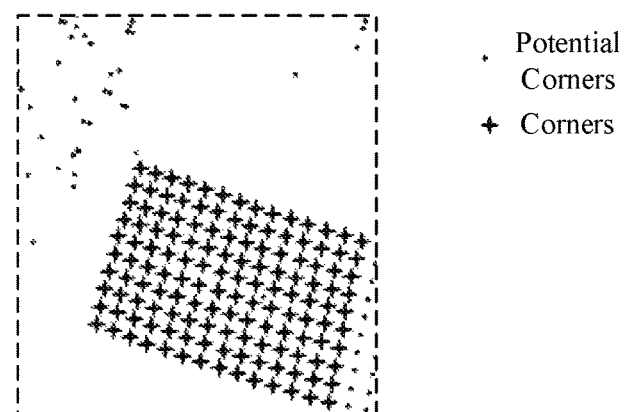
FIG. 3C shows an exemplary reconstructed chessboard in a corner marking method according to one embodiment of the present disclosure.

At operation S222, filtering of the potential corners is performed to acquire the corners in the target image based on positional relationships among the potential corners. For example, the potential corners may be filtered based on minimum distances between each two potential corners, according to which the most isolated points among the potential corners are removed from consideration. In addition, rows and columns of the chessboard can be determined based on positional relationships among the potential corners, and potential corners that fall outside of the determined rows and columns are also removed from consideration. Further, the potential corners may be filtered based on a desired number of potential corners in each row and column so that each row contains the same number of potential corners and each column contains the same number of potential corners. FIG. 3C shows an exemplary reconstructed chessboard in a corner marking method according to one embodiment of the present disclosure.

In addition to adopting the process described at operation S222, points that are relatively more regularly distributed in the target image may also be acquired as corners in the target image. Based on the corners in the target image acquired after the filtering of the potential corners, the target chessboard can be reconstructed, e.g., the largest rectangle that is formed by an array of corners from the acquired corners can be acquired as the reconstructed chessboard, see FIG. 3C; or an image in that largest rectangle can also be acquired as the reconstructed chessboard.

Figure 4A:
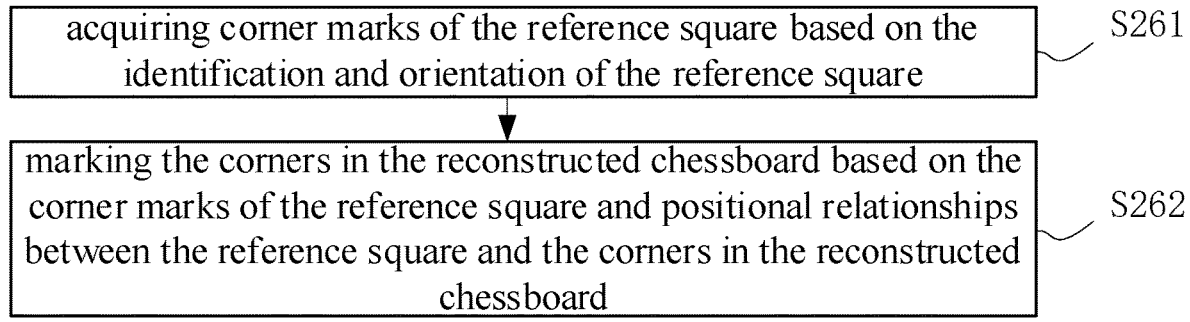
FIG. 4A shows a flowchart of an operation S26 of a corner marking method according to one embodiment of the present disclosure.

FIG. 4A shows a flowchart of an operation of marking corners in a reconstructed chessboard in a corner marking process according to one embodiment of the present disclosure. Referring to FIG. 4A, in an embodiment of the present disclosure, marking the corners in the reconstructed chessboard based on the identification and orientation of the reference square includes operations S261 and S262.

Operation S261 includes acquiring corner marks of the reference square based on the identification and orientation of the reference square. Specifically, the identification of each tagging square and corner marks of its corners may be acquired in advance, and the numbering of the corners of each tagging square may also be acquired in advance. Note, a corner of a tagging square is both numbered and labeled with a corner mark. For example, each tagging square may be provided with a unique identification (e.g., ID1, ID2) indicated by its tag to represent its identity, each corner of each tagging square may be provided with a corner mark (e.g., ①, ②), and all corners in the target chessboard (including those of the tagging square) may be numbered with consecutive integers (e.g., 1, 2, 3). Herein, "marking the corners in the reconstructed chessboard" is another way of saying "acquiring the numbering of the corners in the reconstructed chessboard corresponding to the target chessboard".

Figure 4B:
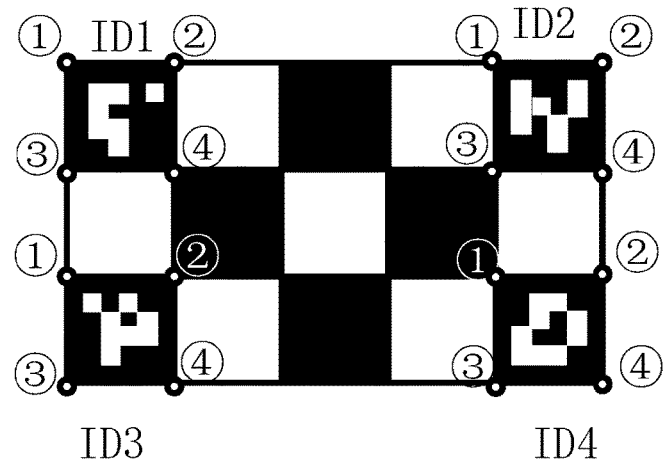
FIG. 4B shows an exemplary target chessboard in a corner marking method according to one embodiment of the present disclosure.
Figure 4C:
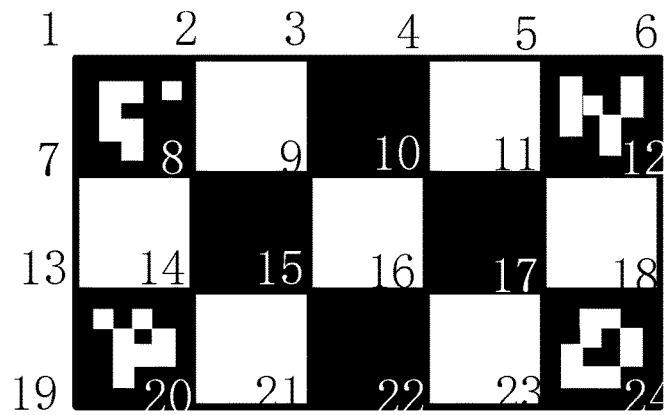
FIG. 4C shows an exemplary target chessboard in a corner marking method according to one embodiment of the present disclosure.

FIG. 4B shows an exemplary target chessboard in a corner marking process according to one embodiment of the present disclosure. As shown in FIG. 4B, there are four tagging squares provided with identifications ID1, ID2, ID3, and ID4 respectively, and four corners of each tagging square are sequentially labeled with corner makers ①, ②, ③, and ④ in a certain order (e.g., clockwise, or counterclockwise). FIG. 4C shows an exemplary target chessboard in a corner marking process according to one embodiment of the present disclosure. As shown in FIG. 4C, the corners in the target chessboard are marked with numerals 1, 2, . . . , 24. Thus, the corner marks (e.g., ①, ②) of the corners of the reference square can be acquired based on the orientation of the reference square; the numbering (e.g., 1, 2) of the corners of the reference square with respect to the entire target chessboard can be acquired based on the identification (e.g., ID1, ID2) of the reference square and the corner marks (e.g., ①, ②) of the corners of the reference square.

Figure 4D:
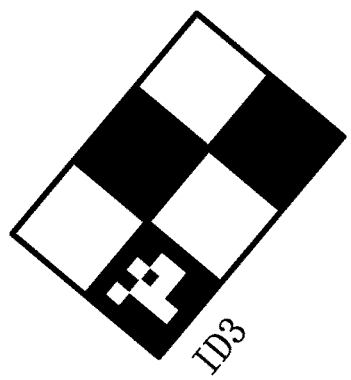
FIG. 4D shows an exemplary reconstructed chessboard in a corner marking method according to one embodiment of the present disclosure.
Figure 4E:
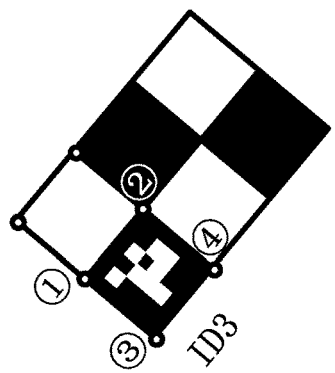
FIG. 4E shows an exemplary reconstructed chessboard in a corner marking method according to one embodiment of the present disclosure.

FIG. 4D shows an exemplary reconstructed chessboard in a corner marking process according to one embodiment of the present disclosure. As shown in FIG. 4D, the reconstructed chessboard contains a reference square; for example, the reference square's tag shows its orientation and also shows that its identification is ID3, based on which the corner marks of the corners of the reference square can be acquired. FIG. 4E shows an exemplary reconstructed chessboard in a corner marking process according to one embodiment of the present disclosure. As shown in FIG. 4E, the corners of the reference square in the reconstructed chessboard are labeled with ①, ②, ③, and ④.

Based on FIG. 4B, FIG. 4C, and FIG. 4D, the upper left corner ① of the reference square (with the identification ID3) is numbered with 13, the upper right corner ② of the reference square is numbered with 14, the lower left corner ③ of the reference square is numbered with 19, and the lower right corner ④ of the reference square is numbered with 20. It should be noted that herein the terms upper, lower, left, and right are irrelevant to how the target image is orientated in real life, and instead they refer to locations of the corners with respect to the reference square and can be acquired based on the orientation of the reference square, which is further indicated by the tag of the reference square.

Operation S262 includes: marking the corners in the reconstructed chessboard based on the corner marks of the reference square and positional relationships between the reference square and the corners in the reconstructed chessboard. Specifically, a corner A in the reconstructed chessboard is marked based on the position of the corner A in relation to the reference square. For example, if the corner A is located to the right of the lower right corner (labeled with ④, and also numbered with 20) of the reference square ID3 and the distance between them is approximately equal to N times the length of a single square, then the corner A is numbered (i.e., marked) as 20+N, wherein N is a positive integer. For example, if the corner A is located to the left of the upper left corner (labeled with ①, and also numbered with 17) of the reference square ID4 and the distance between them is approximately equal to M times the length of a single square, then the corner A is numbered (i.e., marked) as 17−M, wherein M is a positive integer. It should be noted that herein the terms left and right are irrelevant to how the target image is orientated in real life, and instead they refer to locations of the corner A with respect to the reference square In one embodiment, the tag of each tagging square is a QR code that, when scanned, returns locations related to the tagging square; for example, the QR code is an APRILTAG. In one embodiment, each tag is a QR code that indicates the locations of the four corners of the corresponding tagging square. Specifically, as an example, each QR code indicates two-dimensional coordinates of the four corners of the corresponding tagging square, so that the orientation of the tagging square can be acquired based on the QR code, and then the corner marks of the corners of the tagging square can be acquired. In this way, a coordinate system that is consistent with the labeling and/or numbering of the squares of the entire target chessboard can be determined, thus eliminating orientation ambiguity that exists in related art.

The target chessboard may include one or more of tagging squares. Optionally, the target chessboard includes five tagging squares, and the five tagging squares are located in the center and four corners of the target chessboard. It is to be understood that the corner marking process described in the present disclosure can have tagging squares at any position of the target chessboard; in some embodiments, a balance between algorithmic robustness and computing speed is achieved by having tagging squares in the center and corners of the target chessboard.

Specifically, in order to implement the corner marking process described in the present disclosure, each camera needs to capture at least one tagging square when it takes a photo of the target chessboard to acquire the target image. Thus, there can be at least one tagging square in the target chessboard; and at most, all squares in the target chessboard can be set as tagging squares. Having fewer tagging squares enables a faster but less robust algorithmic detection; having more tagging squares provides a high robustness but also results in redundancy, which leads to a slower algorithmic detection. In addition, there is a chance that the target chessboard is only partially captured, and therefore in some embodiments, tagging squares are set in the center and four corners of the target chessboard respectively, which increases the chance that the target image contains at least one tagging square and reduces the likelihood of unsuccessful detection.

The tag located in the center of the target chessboard is mainly used for intrinsic parameter calibration, in which case pattern distortion in the center of the chessboard is smaller and the accuracy is higher. The tags located in the four corners are mainly used for extrinsic parameter calibration, in which case pattern distortion at the four corners of the chessboard is smaller and the detection rate is higher. Therefore, providing the target chessboard with five tagging squares in the center and four corners of the target chessboard enables the target chessboard to be used for intrinsic and extrinsic parameter calibrations, both with a high detection rate.

In addition, the tags (e.g., QR codes) can be located in squares of the first color or squares of the second color. In some embodiments, the color (e.g., white) of each QR code is opposite to the color (e.g., black) of the square where the QR code is located. Herein, the color of a QR code refers to the foreground color of the QR code. For example, the color of the QR code in FIG. 4D is white.

Optionally, in order to reduce the complicity of the detection algorithm, the target chessboard adopts white as its background color (that is, areas around the chessboard are white), and the QR codes are in black squares of the chessboard; conversely, the QR codes are in white squares of the chessboard.

In one embodiment of the present disclosure, there are two or more target chessboards. In this case, the target image may contain the two or more target chessboards in entirety or in part.

Specifically, there are many types of QR codes that can return information regarding their surroundings, but each type of such QR codes has only a limited number of distinguishable codes; for example, APRILTAG_16h5 has a total of 30 distinguishable codes, numbered from 0 to 29; different target chessboards can be provided with different sets of codes serving as tags, with one set including five codes; when the codes are selected from APRILTAG_16h5, a total of six different chessboards can be distinguished from each other by using different sets of codes, thus reducing the workload of the multi-camera system during extrinsic parameter calibration.

Figure 5A:
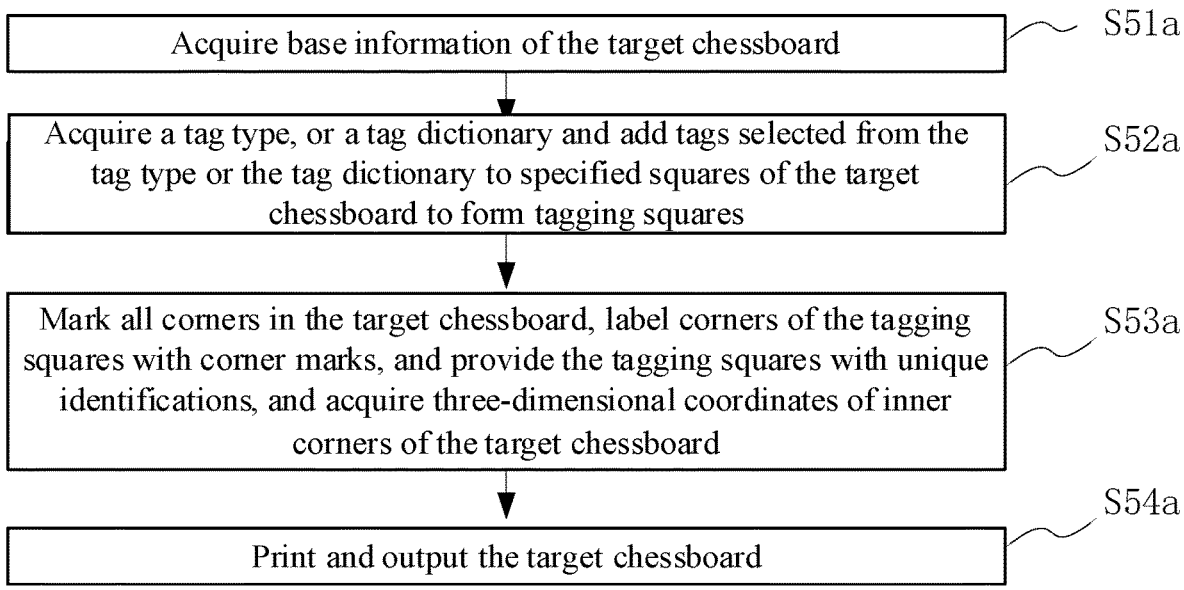
FIG. 5A shows a flowchart of generating a target chessboard in a corner marking method according to one embodiment of the present disclosure.

In an embodiment of the present disclosure, the target chessboard is generated by a chessboard generation process, and its corners are marked by a corner marking process. FIG. 5A shows a flowchart of generating a target chessboard in a chessboard generation process according to one embodiment of the present disclosure.

Specifically, referring to FIG. 5A, the chessboard generation process includes operations S51a to operation S54a.

At operation S51a, base information of the target chessboard is acquired. The base information includes a width of each square, and specifications of the chessboard; in some embodiments, the base information can be acquired from a user instruction.

At operation S52a, a tag type, or a tag dictionary, is acquired; tags selected from the tag type or the tag dictionary are added to specified squares of the target chessboard to form tagging squares.

At operation S53a, all corners in the target chessboard are marked (i.e., numbered), corners of the tagging squares are labeled with corner marks, and the tagging squares are provided with unique identifications indicated by tags, and three-dimensional coordinates of inner corners of the target chessboard are acquired.

Specifically, in one embodiment, the corners in the target chessboard can be sequentially numbered from 0 to X_number×Y_number−1, from left to right and from top to bottom, so as to mark all the corners of the target chessboard. X_number is the number of squares in each row of the target chessboard, and Y_number is the number of squares in each column of the target chessboard, and these two parameters can be modified as needed.

In one example, identifications of the tagging squares can be sequentially configured as ID0, ID1, . . . , ID(Num_ID−1), from left to right and from top to bottom, wherein Num_ID is the number of the total tagging squares. The identifications of the tagging squares can also be adjusted according to actual needs, as long as each tagging square has a unique identification.

In one embodiment, the corners of each tagging square is labeled with corner marks ①, ②, ③, ④ in a clockwise order staring from the top left corner of the tagging square; in some other embodiments, the corners of each tagging square is labeled with corner marks ①, ②, ③, ④ in a counter-clockwise order staring from the top left corner of the tagging square.

In one embodiment, the identifications of the tagging squares and the corner marks of the corners are asymmetric, thereby eliminating problems caused by the symmetry and orientation ambiguity of common chessboards, which makes the present disclosure especially advantageous for scenarios where corner marks of corners cannot be confirmed due to partial occlusion.

In addition, the three-dimensional coordinate of a corner in the chessboard is given by:(x_idx×scale, y_idx×scale, z), wherein scale refers to a measured width of a square, x_idx refers to a numeral assigned to the corner in the x-direction during numbering, y_idx refer a numeral assigned to the corner in the y-direction during numbering; in addition, since the chessboard is a plane, the z coordinate can be an arbitrary value z, for example 0 or 1.

At operation S54a, the target chessboard is output and printed.

Figure 5B:
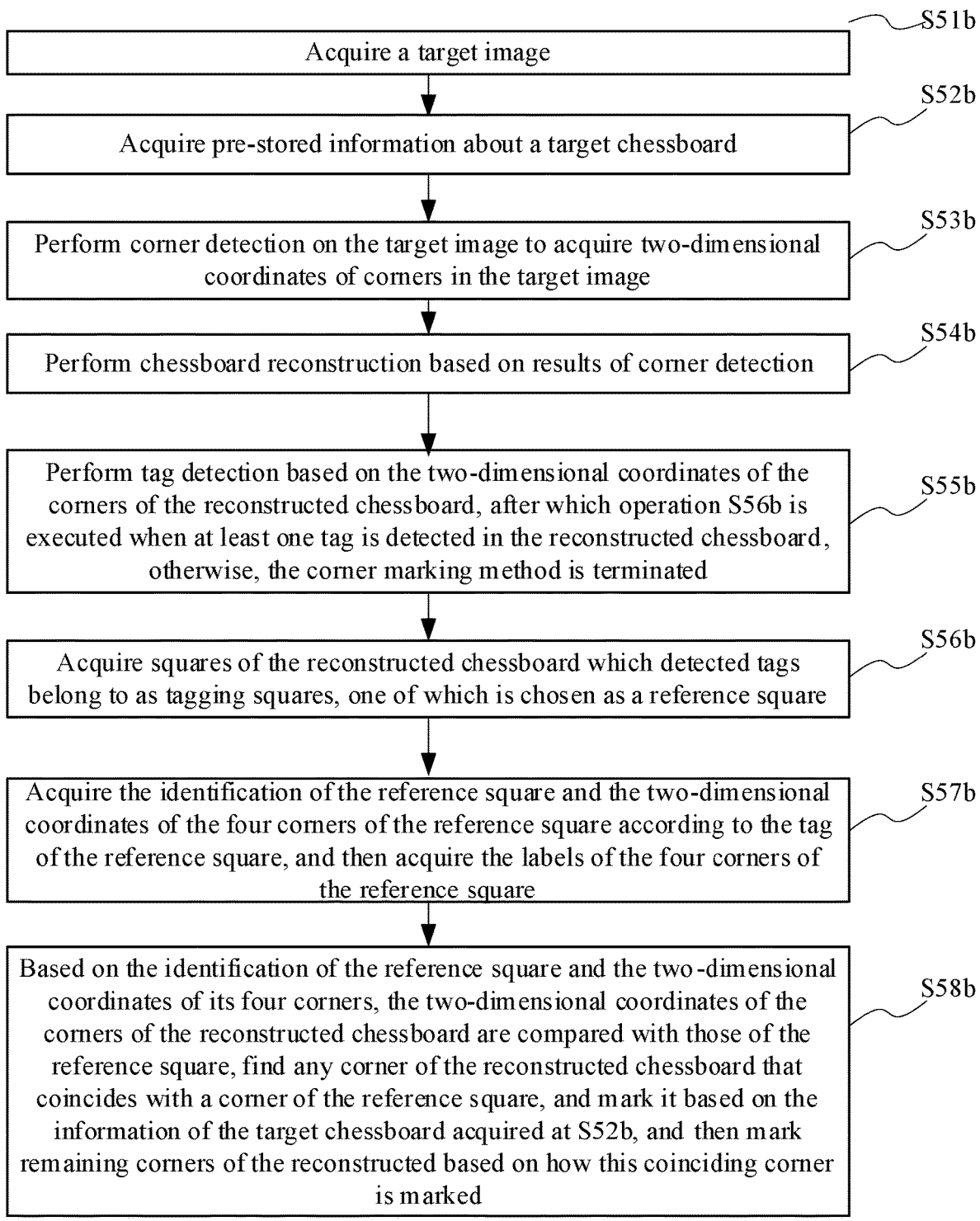
FIG. 5B shows a flowchart of a corner marking method according to one embodiment of the present disclosure.

FIG. 5B is a flowchart illustrating a corner marking process according to an embodiment of the present disclosure. Referring to FIG. 5B, the corner marking process includes operations S51b to S58b.

At operation S51b, a target image is acquired, wherein the target image is an image of the target chessboard captured by a camera and includes at least a portion of the target chessboard.

At operation S52b, pre-stored information about the target chessboard is acquired, and the information is specifically related to corner marking, including the width of each square, the specifications of the target chessboard, the type of tags (or dictionary of tags), the locations of the tagging squares, the identifications of the tagging squares, the corner marks of the corners of the tagging squares, and/or the three-dimensional coordinates of the inner corners of the tagging squares. The pre-stored information is generated when the target chessboard is generated.

At operation S53b, corner detection is performed on the target image to acquire two-dimensional coordinates of corners in the target image. Preferably, operation S53b may include sub-pixel optimization to improve the accuracy of the corner detection. The corner detection can be achieved using a method similar to operation S22.

At operation S54b, chessboard reconstruction is performed based on results of corner detection (i.e., detected corners): using the two-dimensional coordinates of the corners acquired at operation S53b, the largest rectangle that is formed by an array of corners from the corners acquired at operation S53b is acquired to be a reconstructed chessboard, in order to further obtain two-dimensional coordinates of filtered corners (e.g., corners of the reconstructed chessboard). The reconstructed chessboard at least partially corresponds to the target chessboard, and also includes tagging squares, tags, numbered corners, corner marks of corners, all of which entirely or partially correspond to those of the target chessboard. The target image partially contains the target chessboard, and contains corners from which the reconstructed chessboard is built.

At operation S55b, tag detection is performed based on the two-dimensional coordinates of the corners of the reconstructed chessboard; operation S56b is then executed when at least one tag is detected in the reconstructed chessboard; otherwise, the corner marking method is terminated.

At operation S56b, squares of the reconstructed chessboard which detected tags (if any) belong to are acquired as tagging squares, and one of them is chosen as a reference square of the reconstructed chessboard.

At operation S57b, the identification of the reference square and the two-dimensional coordinates of the four corners of the reference square are acquired based on the tag of the reference square, and then the corner marks of the four corners of the reference square are acquired.

At operation S58b, based on the identification of the reference square and the two-dimensional coordinates of its four corners, the two-dimensional coordinates of the corners of the reconstructed chessboard (acquired at S54b) are compared with those of the corners of the reference square, to find any corner of the reconstructed chessboard that coincides with a corner of the reference square, and mark it based on the information of the target chessboard acquired at S52b, and remaining corners of the reconstructed are then marked based on how this coinciding corner is marked.

Specifically, each tagging square has at least one inner corner, which coincides with an inner corner of the reconstructed chessboard, and hereinafter the former is referred to as a coinciding corner of the tagging square, and the latter is referred to as a coinciding corner of the reconstructed chessboard. The same applies to the target chessboard and its tagging squares. For each tagging square of the reconstructed chessboard, after the two-dimensional coordinates of the inner corners of the tagging square and the two-dimensional coordinates of the inner corners of the reconstructed chessboard are acquired, the inner corners of the reconstructed chessboard can have their corner marks determined based on two-dimensional Euclidean distances (e.g., the ones between the coinciding corner of the tagging square and the inner corners of the reconstructed chessboard) to eliminate the orientation ambiguity of the chessboard.

The marking process starts from the coinciding corner of the reconstructed board, and then spreads to the remaining corners of the reconstructed chessboard. In the above process, each tagging square of the reconstructed chessboard identifies and marks its own internal corners, and also eliminates the orientation ambiguity of the chessboard (because, for example, the internal corners of the tagging square are marked in a clockwise order), based on which a unique two-dimensional coordinate system applied to the plane where the reconstructed chessboard is can be determined, with the origin, x-axis and y-axis of the coordinate system specified, thereby marking all corners in the target image.

The present disclosure also provides a parameter calibration process based on the corner marking process described above. Specifically, in an embodiment of the present disclosure, the parameter calibration process includes: marking the corners in the target image using the corner marking method shown in FIG. 2C; and calibrating camera parameters based on the marked corners of the target image.

Optionally, the parameter calibration process includes calibrating intrinsic camera parameters and calibrating extrinsic camera parameters.

Specifically, calibrating the intrinsic camera parameters can be achieved based on the two-dimensional coordinates and three-dimensional coordinates of the corners, using methods of intrinsic parameters calibration in the related art.

In the process of calibrating extrinsic camera parameters, since the target chessboard will be captured by two or more cameras, it is necessary to acquire detection results of all the cameras, find out the corners that are captured by all of the cameras, and then assemble them based on how the corners are respectively numbered. At this time, the information to be acquired is: two-dimensional coordinates of a first corner in the target image as captured by a first camera, two-dimensional coordinates of second corners that are in the target image as captured by other cameras and have the same numeral assigned to them as the first corner, and three-dimensional coordinates of the corners; calibrating the intrinsic camera parameters can be achieved based on the above information acquired, using methods of extrinsic parameter calibration in the related art.

The present disclosure also provides a computer-readable storage medium on which a computer program is stored, and the computer program is executed by a processor to implement the corner marking process and/or the parameter calibration process described in the present disclosure.

Figure 6:
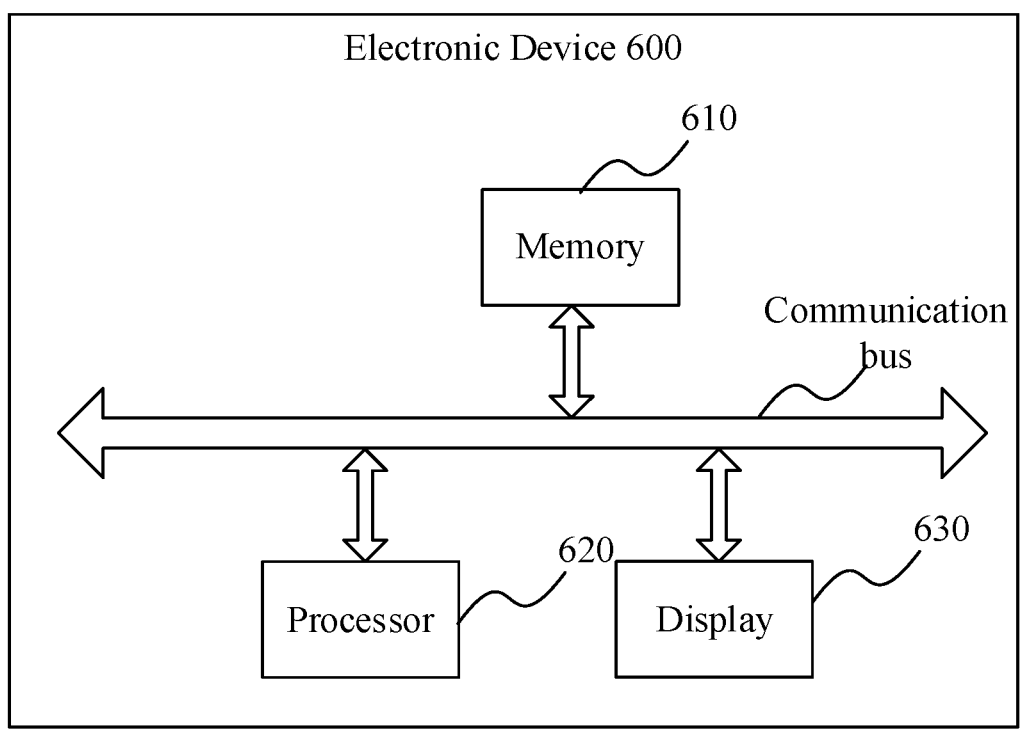
FIG. 6 shows a structural diagram of an electronic device according to one embodiment of the present disclosure.

The present disclosure also provides an electronic device. FIG. 6 is a block diagram illustrating an electronic device according to an embodiment of the present disclosure. Specifically, referring to FIG. 6, in an embodiment of the present disclosure, the electronic device 600 includes: a memory 610, and a processor 620. The memory 610 is configured to store a computer program, and the processor 620 is in communication with the memory 610 and is configured to call the computer program to perform the corner marking method and/or the parameter calibration method described in the present disclosure. In some embodiments, the processor 620 may be a SoC chip, a GPU chip, a DSP chip, or a specified chip for corner marking.

Optionally, the electronic device 600 further includes a display 630, wherein the display 630 is in communication with the memory 610 and the processor 620 for displaying a GUI interaction interface associated with the corner marking method and/or the parameter calibration method.

The scope of protection of the image processing method of the present disclosure is not limited to the order of execution of the operations enumerated herein, and any solution achieved by adding, subtracting, or replacing operations of the prior art according to the principles of the present disclosure is included in the scope of the present disclosure.

As previously described, the corner marking process provided in one or more embodiments of the present disclosure is capable of sub-pixel optimization such that the coordinates of the target chessboard corners on the image are accurate to the fractional level, rather than just the integer level (pixel level), which increases the precision of image feature points used in the calibration.

Specifically, locating functions using corner detection algorithms can be performed in the integer pixel level; in the present disclosure, the corners detected by the corner marking method provided in one or more embodiments are consistent with the corners of the original chessboard (i.e., the target chessboard), and are both inner corners, and gradients at these corners have a high absolute value; that is, there are two orthogonal directions defined in a local area centered on each of the corners, and gradients at these corners have larger absolute values in the two orthogonal directions. Therefore, sub-pixel optimization can be achieved by introducing mathematical means such as the least squares method, and a locating precision (i.e., the precision of the two-dimensional coordinates of the corners in the image) can be improved to the fractional level (i.e., sub-pixel level). Furthermore, the tagging squares introduced in the corner marking process are used to disambiguate the chessboard and label corners, and do not directly use the two-dimensional coordinates of four corners of each tagging square.

Embodiments of the present disclosure are able to eliminate orientation ambiguity of chessboard corners in the related art and to correctly mark the corners without ambiguity even when the captured chessboard is incomplete or distorted.

The corner marking process provided in one or more embodiments of the present disclosure does not need to capture the entire target chessboard, and can achieve parameter calibration of cameras with little to no FOV overlapping by identifying each detected corner from how it is marked.

The corner marking process provided in one or more embodiments of the present disclosure can detect multiple target chessboards from a single target image and distinguish different chessboards by the different sets of tags adopted by the chessboards, which can bring a lot of freedom in the design of calibration algorithms; for example, in the case where the size of each target chessboard is limited, four target chessboards can be used at a time to fill a whole image when calibrating intrinsic parameters, and there is no need to artificially divide the image into different regions for different chessboards beforehand.

In addition, based on the corner marking process provided in one or more embodiments of the present disclosure, there is no need to change the chessboard(s) when switching between intrinsic parameter calibration and extrinsic parameter calibration. Also, the process of the present disclosure is compatible with conventional chessboard detection algorithms; that is, the process of the present disclosure can also be used when the camera can capture the entire chessboard.

Specifically, in some scenarios requiring special equipment arrangement, such as scenarios where there is little to no FOV between the cameras, extrinsic parameter calibration requires a calibration board with random patterns, which means intrinsic parameters calibration and extrinsic parameter calibration will need different calibration boards. The target chessboard described in the present disclosure has tagging squares, and can be used for both intrinsic parameters calibration and extrinsic parameter calibration. Moreover, the tagging squares in the target chessboard does not affect the normal operation of conventional detection programs adapted to conventional chessboard-based calibration, and thus are compatible with the latter.

After adopting the corner marking process provided in one or more embodiments of the present disclosure, there is no need to require that the entire target chessboard be captured when calibrating intrinsic camera parameters, which substantially lowers requirements for the placement of the target chessboard as well as for the photographer. In some embodiments, the target chessboard usually needs to be close to the image edge for shots with large aberrations, which means that the target chessboard is more likely to go beyond the image boundary and lead to failures of the detection algorithm; a conventional solution is to move the target chessboard toward the image center to avoid going beyond the image boundary, but this solution sacrifices information of chessboard corners near the image boundary; as described, the corner marking process of the present disclosure solves such issues.

Therefore, the present disclosure effectively overcomes various shortcomings of the conventional approaches and has a high value for industrial application.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A corner marking method, comprising:
   acquiring a target image comprising at least a portion of a target chessboard, the target chessboard comprising five tagging squares, and each tagging square having a tag comprising an APRILTAG code that indicates an identification of the tagging square, and locations of four corners of the tagging square; wherein the five tagging squares are respectively located in a center and four vertexes of the target chessboard, and comprise five different APRILTAG codes;
   detecting corners in the target image;
   performing a chessboard reconstruction based on detected corners to acquire a reconstructed chessboard;
   acquiring one or more of the tagging squares of the reconstructed chessboard as a reference square if the reconstructed chessboard contains one or more of the tagging squares;
   acquiring the identification and orientation of the reference square based on the tag of the reference square; and
   numbering the corners in the reconstructed chessboard based on the identification and orientation of the reference square.

2. The corner marking method of claim 1, wherein detecting the corners in the target image comprises acquiring the corners in the target image based on gradients at pixels in the target image.

3. The corner marking method of claim 2, wherein acquiring the corners in the target image based on the gradients at the pixels in the target image comprises:
   acquiring potential corners in the target image based on the gradients at the pixels in the target image; and
   filtering to obtain the corners in the target image based on positional relationships among the potential corners.

4. The corner marking method of claim 1, wherein numbering the corners in the reconstructed chessboard based on the identification and orientation of the reference square comprises:
   acquiring corner marks of the reference square based on the identification and orientation of the reference square; and
   numbering the corners in the reconstructed chessboard based on the corner marks of the reference square and positional relationships between the reference square and the corners in the reconstructed chessboard.

5. The corner marking method of claim 1, wherein acquiring the target image comprises:
   acquiring the target image by means of a multi-camera system, wherein cameras of the multi-camera system have field of views (FOVs) partially overlapping with each other.

6. The corner marking method of claim 5, wherein the multi-camera system comprises a fisheye panoramic camera system.

7. The corner marking method of claim 6, wherein acquiring the target image comprises:
   acquiring the target image to acquire at least two target chessboards, wherein at least one of the at least two target chessboards is partially acquired.

8. A parameter calibration method, comprising:
   acquiring a target image comprising at least a portion of a target chessboard, the target chessboard comprising at least one tagging square, and each tagging square having a tag comprising a two-dimensional code that indicates an identification and orientation of the tagging square;
   detecting corners in the target image;
   performing a chessboard reconstruction based on detected corners to acquire a reconstructed chessboard;
   acquiring one or more of the tagging squares of the reconstructed chessboard as a reference square if the reconstructed chessboard contains one or more of the tagging squares;
   acquiring the identification and orientation of the reference square based on the tag of the reference square;
   numbering the corners in the reconstructed chessboard based on the identification and orientation of the reference square by:
      acquiring corner marks of the reference square based on the identification and orientation of the reference square; and
      numbering the corners in the reconstructed chessboard based on the corner marks of the reference square and positional relationships between the reference square and the corners in the reconstructed chessboard, wherein the positional relationships comprise two-dimensional Euclidean distances between a first corner of the reference square and the corners in the reconstructed chessboard; and
   calibrating camera parameters based on the numbered corners of the target image.

9. The parameter calibration method of claim 8, wherein detecting the corners in the target image comprises acquiring the corners in the target image based on gradients at pixels in the target image.

10. The parameter calibration method of claim 9, wherein acquiring the corners in the target image based on the gradients at the pixels in the target image comprises:
    acquiring potential corners in the target image based on the gradients at the pixels in the target image; and
    filtering to obtain the corners in the target image based on positional relationships among the potential corners.

11. An electronic device, comprising:
    a memory, configured to store a computer program; and
    a processor, communicatively coupled to the memory and configured to call the computer program to perform:
       acquiring a target image comprising at least a portion of a target chessboard, the target chessboard comprising at least one tagging square, and each tagging square having a tag comprising a two-dimensional code that indicates an identification and orientation of the tagging square;
       detecting corners in the target image;

performing a chessboard reconstruction based on detected corners to acquire a reconstructed chessboard;

acquiring one or more of the tagging squares of the reconstructed chessboard as a reference square if the reconstructed chessboard contains one or more of the tagging squares;

acquiring the identification and orientation of the reference square based on the tag of the reference square; and numbering the corners in the reconstructed chessboard based on the identification and orientation of the reference square by:

acquiring corner marks of the reference square based on the identification and orientation of the reference square; and numbering the corners in the reconstructed chessboard based on the corner marks of the reference square and positional relationships between the reference square and the corners in the reconstructed chessboard, wherein the positional relationships comprise two-dimensional Euclidean distances between a first corner of the reference square and the corners in the reconstructed chessboard.

12. The electronic device of claim 11, wherein detecting the corners in the target image comprises acquiring the corners in the target image based on gradients at pixels in the target image.

13. The electronic device of claim 12, wherein acquiring the corners in the target image based on the gradients at the pixels in the target image comprises:

acquiring potential corners in the target image based on the gradients at the pixels in the target image; and filtering to obtain the corners in the target image based on positional relationships among the potential corners.

14. The electronic device of claim 11, wherein numbering the corners in the reconstructed chessboard based on the identification and orientation of the reference square comprises:

acquiring corner marks of the reference square based on the identification and orientation of the reference square; and numbering the corners in the reconstructed chessboard based on the corner marks of the reference square and positional relationships between the reference square and the corners in the reconstructed chessboard.

15. The electronic device of claim 11, further comprising a multi-camera system, wherein cameras of the multi-camera system have field of views (FOVs) partially overlapping with each other, wherein acquiring the target image comprises:

acquiring the target image by the multi-camera system.

16. The electronic device of claim 11, wherein the two-dimensional code of each tagging square is a unique APRILTAG_16h5 code indicating locations of four corners of the reference square.

17. The electronic device of claim 11, wherein the processor is further configured to call the computer program to perform:

calibrating camera parameters based on the numbered corners of the target image.

* * * * *